US007006554B2

(12) United States Patent
Sun et al.

(10) Patent No.: US 7,006,554 B2
(45) Date of Patent: Feb. 28, 2006

(54) RESOURCE ALLOCATION IN CDMA WIRELESS COMMUNICATION SYSTEMS

(75) Inventors: Xiaobing Sun, Singapore (SG); Yugang Ma, Singapore (SG)

(73) Assignee: Sony Corporation, Tokyo (JP)

( * ) Notice: Subject to any disclaimer, the term of this patent is extended or adjusted under 35 U.S.C. 154(b) by 781 days.

(21) Appl. No.: 09/989,938

(22) Filed: Nov. 21, 2001

(65) Prior Publication Data

US 2002/0106002 A1  Aug. 8, 2002

(30) Foreign Application Priority Data

Nov. 24, 2000  (SG) .............................. 200006943-5

(51) Int. Cl.
*H04B 1/69* (2006.01)
*H04B 7/216* (2006.01)
(52) U.S. Cl. ...................... 375/130; 375/146; 375/140; 370/342
(58) Field of Classification Search ........ 375/130–146; 370/342
See application file for complete search history.

(56) References Cited

U.S. PATENT DOCUMENTS

| 5,103,459 A | | 4/1992 | Gilhousen et al. |
| 5,745,485 A | * | 4/1998 | Abramson ................ 370/342 |
| 6,026,115 A | | 2/2000 | Higashi et al. |
| 6,393,047 B1 | * | 5/2002 | Popovic' ................... 375/140 |
| 6,577,671 B1 | * | 6/2003 | Vimpari ..................... 375/146 |
| 6,697,622 B1 | * | 2/2004 | Ishikawa et al. ............ 455/434 |

FOREIGN PATENT DOCUMENTS

EP  0 989 686  3/2000

OTHER PUBLICATIONS

Patent Abstracts of Japan 2000 22666 (LG Information & Commun Ltd) Jan. 21, 2000.
Jiunn-Tsair Chen, C.B. Papadias and G. J. Forschini "Dynamic Signature Assignment for Direct-Sequence CDMA Systems", IEEE Communications Letters, vol. 4, No. 6, Jun. 2000, pp. 181-183.
A. Duel-Hallen, et al. "Long-Range Prediction of Fading Signals", IEEE Signal Processing Magazine, vol. 17, No. 3, May 2000, pp. 62-75.

* cited by examiner

*Primary Examiner*—Stephen Chin
*Assistant Examiner*—Cicely Ware
(74) *Attorney, Agent, or Firm*—Frommer Lawrence & Haug LLP; William S. Frommer

(57) ABSTRACT

A dynamic assignment of the spreading codes of a user in a CDMA system is based on multipath channel conditions of that user. The spreading codes are assigned such that multipath signal energies are coherently integrated at the antenna of the receiver to ensure that the multipath components are summed constructively and therefore that a signal gain is obtained. The method is applicable to any CDMA system which uses spreading codes over a multipath channel. A specific algorithm for selecting the codes based on channel parameters and auto-correlation functions of the spreading codes is proposed.

11 Claims, 1 Drawing Sheet

RELATED ART

RESOURCE ALLOCATION IN CDMA WIRELESS COMMUNICATION SYSTEMS

The present invention relates to resource allocation in code-division-multiple-access (CDMA) wireless communication systems, and in particular to the problem of assigning spreading codes to users under different multipath channel conditions.

CDMA is widely used in modern wireless communication systems. For example, one known variety of CDMA system [1] includes multiple base stations each defining a "cell", that is an area surrounding the base station in which transmissions from the base station may be received. Users are provided with mobile communications devices (e.g. mobile phones) which communicate with the base station of the cell in which they are located using CDMA signals transmitted in each direction ("downlink" to the mobile device, and "uplink" to the base station). The CDMA signals for a given user are generated using a spreading code for each user. Each spreading code varies at time increments called "chips" and has a period of N chips (a "symbol"). A signal bit is sent between each mobile device and the base station during each symbol.

In current systems, the spreading codes are assigned by a central resource management unit for each user. This may not be the optimal resource allocation strategy, especially when there is multipath propagation, illustrated in FIG. 1, in which a CDMA signal from a CDMA transmitter 1 (which may be one of a base station or a mobile receiver) is transmitted to a CDMA receiver 3 (which may be the other one of a base station or a mobile receiver) via different paths 5. The components of the multipath signal are added together at the receiving antenna 7. This addition can be constructive or destructive, i.e. the receiving signal amplitude can be larger or less than that of a single path signal.

If the signal bandwidth is larger than channel coherence bandwidth, the multipath delays will spread over many chip intervals. In this case, a specific receiver structure called a RAKE receiver may be appropriate [2]. The RAKE receiver makes use of the multipath signal energies at the symbol-level, i.e. it coherently adds the different delayed multipath signals after despreading each of them. Thus some signal gain is obtained.

A method has been proposed recently which dynamically assigns the spreading codes and delays of multiple users with the object of minimising the mutual cross-correlation among them in the receiver [3]. This method helps to avoid multiple access interference (MAI) which arises when a given user receives signals from multiple transmitters. However, the method can only be used in the uplink of a cellular CDMA system by a base station which knows all the spreading codes for all users. Also, the algorithm to determine the spreading codes is complex and can only be implemented recursively. Another drawback of the method is if the number of users in a cell is low, the benefit of the method decreases.

The present invention aims to provide a new and useful method for assigning spreading codes in a CDMA communication system. This general problem has relevance for many different fields including wireless cellular communications, satellite communications, local area networks, personal area networks and wireless local loops. One of its major applications is to assign spreading codes of a CDMA system.

In general terms, the present invention proposes matching the spreading code and the multipath channel of each receiver, so that the signal energies of different paths add constructively instead of destructively at the antenna of the receiver. This may make it possible to make full use of the multipath signal energies. The benefit of the proposed method is most evident for a frequency-selective channel in which the multipath delay profile spreads over many chip intervals.

Important advantages of a preferred embodiment of the invention compared to the known systems described above are that: (1) it makes fuller use of the multipath signal energies than does the RAKE receiver [2]; (2) by selecting appropriate spreading codes, the multipath channel itself delays and modifies the signals and makes most of the mulitpath components contribute constructively to the sum of the received signal; (3) as input data the embodiment employs only channel estimation information, and the auto-correlation functions of the spreading codes; (4) the algorithm to find the best spreading codes may be very simple; and (5) it can be used in both ends of a radio link (for cellular communications, both uplink and downlink).

Preferred features of the invention will now be described, for the sake of illustration only, with reference to the following figures in which.

Figure 1:
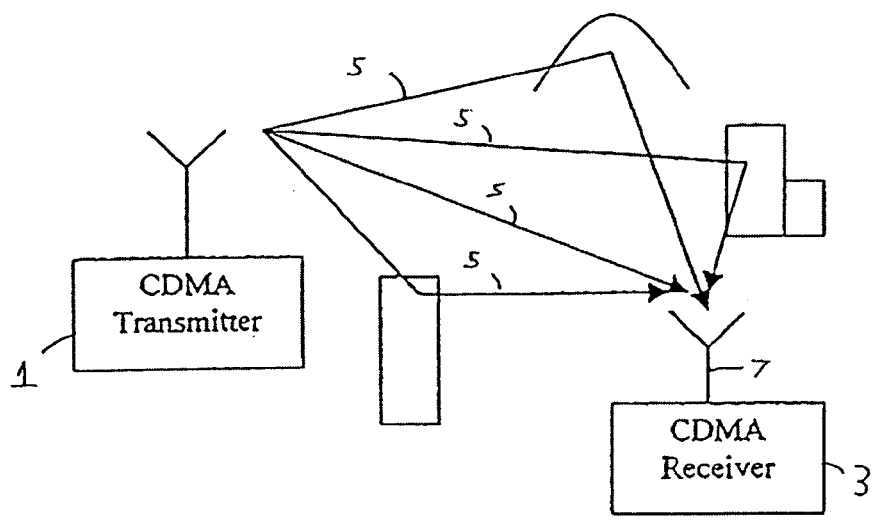
FIG. 1 shows a multipath channel between a transmitter and a receiver.

A procedure according to the invention for dynamic assignment of spreading codes, which may be performed by the CDMA receiver 3 of FIG. 1, will be explained with reference to FIG. 2.

(1) Signals received by the aerial 7 are CDMA signals which use spreading codes to spread the symbols of the transmitted data. These signals are propagated over a multipath channel where the multipath delays are longer than at least one chip's period. The received signal is input to circuitry shown in FIG. 2, in which it is sent to a channel estimation or channel prediction unit 9, a RAKE receiver unit 11 as described in [2], and a unit 13 which informs the RAKE receiver unit 11 of changes in the receiver's spreading code.

(2) In the unit 9, the parameters of the multipath propagating channel to the receiver are estimated in real-time by a method which may either be training-based (i.e. if the aerial 7 receives signals encoding known data) or blind. Two such known methods are the training-based maximum-likelihood algorithm or blind-based moment algorithm. Alternatively, unit 9 may predict the channel parameters based on other information.

The channel parameters are here denoted by a set of L complex channel coefficients c(j), where L is the maximum delay expressed as a number of chip periods. Specifically, the multipath channel may be modelled as a tap-delay-line structure with complex coefficients: c(0), c(1), ..., c(L−1).

(3). The unit 9 sends the estimated channel parameters to a spreading code selection unit 15 where the spreading codes with better performance are selected based on the channel parameters and the auto-correlation functions of all the available spreading codes.

Suppose that the invention is used to select a spreading code from K possibilities, labelled by k=1, ..., K. For a specific kind of spreading code (for example Gold codes or Walsh codes) of a specific code length, it is easy to calculate the auto-correlation function $r_s(k, i)$ of the $k^{th}$ code at the $i^{th}$ delay.

The best code over the multipath channel may be determined as the k given by:

$$k = \arg\max_{k}\left\{m(k) = \text{Re}\left[\sum_{j=0}^{L-1} c*(j)\sum_{i=0}^{L-1} c(i)r_s(k, i-j)\right]\right\} \quad (1)$$

where * represents complex conjugate, and $$\arg\max_{k} f(k)$$

means the value of k which maximises any function f(k). Note that for many known spreading codes (e.g. Gold and Walsh codes) the contents of the square bracket in (1) are real in any case, and thus the operation Re (i.e. taking the real part of the square bracket) does not change the result.

Note that we have derived the expression for m(k) in (1) from the RAKE receiver structure. The signal received in one finger of the RAKE receiver after correlation may be expressed as $$\sum_{i=0}^{L-1} c(i)r_s(k, i),$$

and each finger's contribution to the RAKE receiver output may be represented by one of the $$c*(j)\sum_{i=0}^{L-1} c(i)r_s(k, i-j),$$

so that m(k) represents the overall RAKE receiver output. Thus, if the RAKE receiver 11 is replaced by a receiver which is not a RAKE receiver, m(k) in equation (1) is preferably be modified appropriately.

(4). Unit 15 instructs a code request generation unit 17 to send a signal identifying the spreading code k with best performance to a resource allocating centre. In the case of an embodiment which is a cellular wireless telephone system, this centre is preferably in the base station. So, if the method according to the invention is being carried out by a CDMA receiver which is a mobile phone, then a signal will have to be transmitted to the base station, whereas if the CDMA receiver which is performing the invention is the base station itself, no transmission is necessary. Alternatively, one resource allocating centre may be shared by many base stations.

The resource allocating centre determines whether the requested code is available. If the required code is available and any other conditions are satisfied (for example, the priority of the radio link is the highest), the requested code is used to spread the symbols of that link. Note that the spreading codes used both uplink and downlink are preferably different.

Actually, if frequency division duplex is used, the uplink and downlink channels are also different.

(5). If the required spreading code is not available, the resource allocating centre will send some information to the receiver which issued that request. The code-selection block 15, selects the next best spreading code, and instructs the unit 17 to transmit a signal identifying that code.

(6). Repeat steps (4) and (5) until a spreading code is finally determined.

Figure 2:
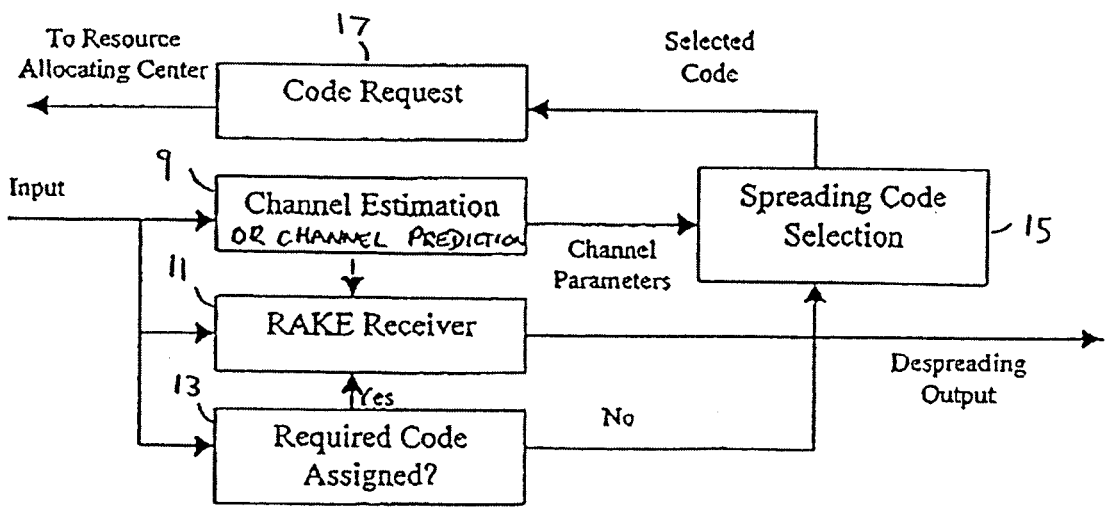
FIG. 2 is a block diagram of a receiver which is an embodiment of the present invention.

FIG. 2 includes a unit 13 which notifies the unit 11 of changes in the spreading code. There are various ways in which unit 11 may operate. If the resource allocating centre is present in the receiver (e.g. in a cellular communication system, if the receiver is a base station containing a resource allocating centre) an electric connection can be provided from the resource allocating centre to the unit 13. In cellular comunications systems, the spreading codes determined by a base station may be notified to the mobile phones by a common communication channel which is shared by all users within the cell. However, alternatively, the code information may be transmitted along the same communication channel to which it relates using the previous spreading code. In a further alternative, unit 13 may not receive a message that a new code has been assigned, but actually deduce it from the CDMA signal.

(7). The RAKE receiver 11 despreads the received signals using the channel estimation from the unit 9 and the spreading code notified by the unit 13.

The proposed method can be used at either or both ends of the radio links of a CDMA communication system. For example, in a cellular wireless communication system, the channel can be either of a downlink and a uplink channel. The spreading codes can be any kind which have non-uniform sidelobes at their auto-correlation functions, for example the Gold codes or Walsh codes (Orthogonal Variable Spreading Factor (OVSP) codes).

REFERENCES

The disclosure of the following documents is incorporated herein by reference.

[1]. K. S. Gilhousen et al. "System and Method for Generating Signal Waveforms in a CDMA Cellular Telephone System", U.S. Pat. No. 5,103,459.

[2] J. G. Proakis, "Digital Communications", $3^{rd}$ edition, McGraw-Hill, 1995, pp 797–806.

[3]. Jiunn-Tsair Chen, C. B. Papadias and G. J. Foschini "Dynamic Signature Assignment for Direct-Secquence CDMA Systems", IEEE Communication Letters, Vol. 4, No. 6, 2000.

[4]. A. Duel Hallen, et al "Long-Range Prediction of Fading Signals", IEEE Signal Processing Magazine, Vol. 17, No. 3, May 2000.

The invention claimed is:

1. A method for assigning a spreading code to a communication device which is part of a CDMA communication system in which a plurality of communication devices receive and/or transmit signals encoded by respective spreading codes, the method comprising the steps of:
   deriving parameters of a multipath signal propagation channel for the device;
   computing for each of a set of possible spreading codes a respective performance value by combining values each corresponding to a component of a multipath signal for that spreading code, or each corresponding to a component of the signal input or output from receiver for that spreading code, using said derived channel parameters and an auto-correlation function of the corresponding spreading code;

selecting one of the possible spreading codes based on the performance values; and assigning said selected spreading code to said device.

2. A method according to claim 1 in which said performance value of the k-th code is a value m(k) given by $$m(k) = \text{Re}\left[\sum_{j=0}^{L-1} c*(j) \sum_{i=0}^{L-1} c(i) r_s(k, i-j)\right],$$

where $r_s(k,i)$ is the auto-correlation of the k-th code at a delay of i chip periods.

3. A method according to claim 1 in which said selection step includes:
 (1) assessing which of the set of possible spreading codes has the highest performance value;
 (2) determining whether that spreading code fulfils one or more acceptance criteria,
 (3) if in step (2) it is determined that that code fulfils the or each acceptance criterion, assigning that code to the device, and otherwise excluding that code from the set of possible spreading codes and returning to step (1).

4. A method according to claim 3 in which one said acceptance criterion is that the code is not presently in use by another device.

5. A method according to claim 1 in which said step of deriving parameters is performed by measurement of a CDMA signal received by the device.

6. A communication device for use in a CDMA communication system in which a plurality of communication devices receive and/or transmit signals encoded by respective spreading codes, the device comprising:
 antenna means for receiving CDMA signals;
 decoding means for decoding the CDMA signals using a spreading code associated with the device;
 means for deriving parameters of a multipath signal propogation channel associated with the antenna;
 means for computing for each of a set of possible spreading codes a respective performance value by combining values each corresponding to a component of a multipath signal for that spreading code, or each corresponding to a component of the signal input or output from receiver structure for that spreading code, using said derived channel parameters and an auto-correlation function of the corresponding spreading code;
 means for selecting one of the possible spreading codes based on the performance values.

7. A device according to claim 6 in which said performance value of the k-th code is a function m(k) given by $$m(k) = \text{Re}\left[\sum_{j=0}^{L-1} c*(j) \sum_{i=0}^{L-1} c(i) r_s(k, i-j)\right],$$

where i is an integer i= 0, . . . ,L−1, the L values {c(i)} are said derived parameters, each corresponding to a respective delay of i chip periods, and $r_s(k,i)$ is the auto-correlation of the k-th code at a delay of i chip periods.

8. A device according to claim 6 in which said device includes:
 assessment means for assessing which of the set of possible spreading codes has the highest performance value;

means for transmitting to a resource allocating centre a proposal that the spreading code with the highest performance value is associated with the device, and determining whether that centre accepts the proposal;

control means arranged, upon determining that the centre accepts the proposal, to transmit the spreading code with the highest performance value to the decoding means, and, upon determining that the centre rejects the proposal, to trigger said assessment means to operate again excluding the spreading code with the highest performance value from the set of possible spreading codes.

9. A CDMA communication system comprising a plurality of communication devices which receive and/or transmit signals encoded by respective spreading codes, and a resource allocation centre,
 each device being arranged to compute for each of a plurality of spreading codes a respective performance value by combining values each corresponding to a component of a multipath signal for that spreading code, or each corresponding to a component of the signal input or output from a receiver structure for that spreading code, using channel parameters of a channel associated with that device, and an auto-correlation function for that spreading code,
 each device being arranged to generate a proposal for a spreading code to be associated with that device based on said performance values, and submit the proposal to the resource allocation centre;
 the resource allocation centre being arranged to receive the proposals, determine if they meet approval criteria, and accordingly transmit approvals or disapprovals to the devices.

10. A method for assigning a spreading code to a communication device which is part of a CDMA communication system in which a plurality of communication devices receive and/or transmit signals encoded by respective spreading codes, the method comprising the steps of:
 deriving parameters of a multipath signal propagation channel for the device, such that the L parameters c(i), where i is an integer i=0, . . . ,L−1, each correspond to a respective delay of i chip periods;
 computing for each of a set of possible spreading codes a respective performance value, such that said performance value of the k-th code is a value m(k) given by $$M(k) = \text{Re}\left[\sum_{j=0}^{L-1} c^*(j) \sum_{i=0}^{L-1} c(i) r_s(k, i-j)\right],$$

where $r_s(k,i)$ is the auto-correlation of the k-th code at a delay of i chip periods;
 selecting one of the possible spreading codes based on the performance values; and
 assigning said selected spreading code to said device.

11. A communication device for use in a CDMA communication system in which a plurality of communication devices receive and/or transmit signals encoded by respective spreading codes, the device comprising:

antenna means for receiving CDMA signals;

decoding means for decoding the CDMA signals using a spreading code associated with the device;

means for deriving parameters of a multipath signal propagation channel associated with the antenna, such that the L parameters c(i), where i is an integer i=0, . . . ,L−1, each correspond to a respective delay of i chip periods;

means for computing for each of a set of possible spreading codes a respective performance value using said derived channel parameters, such that said performance value of the k-th code is a value m(k) given by $$M(k) = \mathrm{Re}\left[\sum_{j=0}^{L-1} c^*(j) \sum_{i=0}^{L-1} c(i) r_s(k, i-j)\right],$$

where $r_s(k,i)$ is the auto-correlation of the k-th code at a delay of i chip periods.

* * * * *